US012094039B1

(12) United States Patent
Savary (10) Patent No.: US 12,094,039 B1
(45) Date of Patent: Sep. 17, 2024

(54) USER INTERFACE FOR VISUALIZING HIGH-DIMENSIONAL DATASETS

(71) Applicant: Bentley Systems, Incorporated, Exton, PA (US)

(72) Inventor: Simon Savary, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 189 days.

(21) Appl. No.: 17/978,739

(22) Filed: Nov. 1, 2022

(51) Int. Cl.
G06T 11/20 (2006.01)
G06F 16/28 (2019.01)

(52) U.S. Cl.
CPC .......... *G06T 11/206* (2013.01); *G06F 16/283* (2019.01)

(58) Field of Classification Search
CPC .... G06T 11/206; G06F 16/283; G06F 16/904; G06F 16/248; G06F 16/9038
See application file for complete search history.

(56) References Cited

U.S. PATENT DOCUMENTS

| | | | |
|---|---|---|---|
| 7,953,738 B2 | 5/2011 | Chickering et al. | |
| 11,321,885 B1* | 5/2022 | Du | G06T 11/206 |
| 2008/0109740 A1 | 5/2008 | Prinsen et al. | |
| 2012/0313949 A1 | 12/2012 | Rope et al. | |
| 2016/0103885 A1* | 4/2016 | Lee | G06F 16/2465 |
| | | | 707/750 |
| 2017/0262506 A1* | 9/2017 | Sharma | G06F 16/2462 |
| 2018/0357292 A1* | 12/2018 | Rai | G06F 16/2455 |
| 2023/0306033 A1* | 9/2023 | Narechania | G06F 16/24575 |

OTHER PUBLICATIONS

Gajdoš, Petr, et al., "A Parallel Fruchterman—Reingold Algorithm Optimized for Fast Visualization of Large Graphs and Swarms of Data," Elsevier B.V., Elsevier, ScienceDirect, Swarm and Evolutionary Computation, vol. 26, Aug. 14, 2015, pp. 56-63.
"Principal Components and Factor Analysis," retrieved from the Internet <https://pjbartlein.github.io/GeogDataAnalysis/lec16.html>, retrieved from the Internet on Oct. 31, 2022, pp. 1-26.

(Continued)

*Primary Examiner* — Xilin Guo
(74) *Attorney, Agent, or Firm* — Cesari and McKenna, LLP; James A. Blanchette (57) ABSTRACT

In example embodiments, a user interface of a software application is provided for visualizing high-dimensional datasets, which simultaneously displays marginal distributions and joint distributions of variables that represent different attributes (e.g., properties) of entities (e.g., elements of infrastructure). The marginal distributions and joint distributions are combined into a single visualization that may be shown in a single window of the application. The visualization may include a graph (e.g., a bar chart) for each of the variables showing the marginal distribution of the variable, wherein each graph is displayed along a different portion of a perimeter of a closed shape (e.g., a circle). The visualization may also include graphics (e.g., lines) connecting portions of the bar charts showing the joint distribution for possible pairs of variables, wherein each graphic (e.g., line) is displayed with visual properties (e.g., a thickness) that indicates co-occurrence frequency of values of the variables.

20 Claims, 8 Drawing Sheets

(56) References Cited

OTHER PUBLICATIONS

Van Der Maaten, Laurens, et al., "Visualization Data Using t-SNE," Journal of Machine Learning Research, vol. 9, Nov. 2008, pp. 2579-2605.

Waskom, Michael, "An Introduction to seaborn," seaborn, retrieved from the Internet <https://seaborn.pydata.org_tutorial_introduction.html>, retrieved from the Internet on Oct. 31, 2022, pp. 1-8.

Xie, Cong, et al., "A Visual Analytics Approach for Categorical Joint Distribution Reconstruction from Marginal Projections," IEEE, IEEE Transactions on Visualization and Computer Graphics, vol. 23, Issue 1, Jan. 2017, pp. 51-60.

* cited by examiner

E_OHPRIMARY CONDUCTOR

| CKT ID |
|---|
| CONDUCTOR SIZE |
| CONDUCTOR TYPE |
| CONTAINER ID |
| LIFECYCLE STATUS |
| PHASE |
| PRIMARY VOLTAGE |
| VOLTAGE RATING |
| XFM ID |

E_OHPRIMARY

| CKT ID |
|---|
| CONDUCTOR SIZE |
| CONDUCTOR TYPE |
| LIFECYCLE STATUS |
| NUMBER OF NEUTRALS |
| OH PHASE ORIENTATION |
| PHASE |
| PRIMARY VOLTAGE |
| PRIMARY ENDID |
| PRIMARY NETID |
| PRIMARY STARTID |
| STRUCTURAL ENDID |
| STRUCTURAL NETID |
| STRUCTURAL STARTID |
| VOLTAGE RATING |
| XFM ID |

E_OHCAPACITORUNIT

| CKT ID |
|---|
| CONTAINER ID |
| K VAR SIZE |
| LIFECYCLE STATUS |
| PHASE |
| PRIMARY VOLTAGE |
| VOLTAGE RATING |
| XFM ID |

USER INTERFACE FOR VISUALIZING HIGH-DIMENSIONAL DATASETS

BACKGROUND

Technical Field

The present disclosure relates generally to software application user interface design, and more specifically to a user interface for visualizing high-dimensional datasets.

Background Information

A variety of types of computing and analysis tasks utilize high-dimensional datasets. As used herein, the term "high-dimensional dataset" refers to a dataset that includes a plurality of values for each of three or more variables, wherein each variable represents a different attribute of entities. Depending upon the particular use case, the variables, attributes and entities may take different forms. For example, high-dimensional datasets are commonly used in the training of machine learning (ML) models to perform detection, classification, and other tasks (collectively "ML tasks") upon elements of infrastructure (e.g., buildings, factories, roads, railways, bridges, electrical and communication networks, equipment, etc.) that have been built or are planned to be built. The attributes may include properties of elements of infrastructure, such as their height, weight, material, type, voltage, phase, etc. which may be represented by variables (e.g., categorical variables or continuous variables) having a plurality of values (e.g., multiple numeric values or multiple non-numeric values). Likewise, high-dimensional datasets may be used in other types of analysis that don't involve ML models or elements of infrastructure. In such case, attributes may take other forms.

When working with high-dimensional datasets, such as those used in the training of ML models or other types of analysis, users often require knowledge about the frequency at which variables individually have values (i.e. their marginal distributions) and about how the values of different variables correlate with each other (i.e. their joint distributions). For example, in order to choose an appropriate ML model to train to perform a ML task, a data scientist or ML engineer often requires knowledge about marginal distributions and joint distributions to orient their choice. Visualizations are a powerful way of conveying information about distributions, and a variety of software applications have attempted to generate visualizations in their user interfaces that can convey this information to users. However, existing visualizations have suffered from shortcomings that have hindered their use. A typical way of showing marginal distributions is with separate bar graphs for each variable, and a typical way of showing joint distributions is with separate scatters plots for individual pairs of variables. The result is a large number of individual visualizations, that are typically shown either sequentially (e.g., cycled though in one window of the user interface), or individually (e.g., in different windows of the user interface). The user is often overwhelmed with the number of individual visualizations, and can only focus on a small subset of them at any given moment. Relationships across different visualizations are often difficult to perceive, and frequently overlooked, hindering analysis of high-dimensional datasets.

Accordingly, there is a need for an improved user interface of a software application for visualizing high-dimensional datasets.

SUMMARY

In various example embodiments, a user interface of a software application is provided for visualizing high-dimensional datasets (e.g., training datasets for a ML model), which simultaneously displays marginal distributions and joint distributions of variables that represent different attributes (e.g., properties) of entities (e.g., elements of infrastructure). The marginal distributions and joint distributions are combined into a single visualization that may be shown in a single window of the application. The visualization may include a graph (e.g., a bar chart) for each of the variables showing the marginal distribution of the variable, wherein each graph is displayed along a different portion of a perimeter of a closed shape (e.g., a circle). The visualization may also include graphics (e.g., lines) connecting portions of the bar charts showing the joint distribution for possible pairs of variables, wherein each graphic (e.g., line) is displayed with visual properties (e.g., a thickness) that indicates co-occurrence frequency of values of the variables. Showing the information all at once in one visualization may allow a user to perceive relationships between the values of an individual variable and the values of other variables that may be obscured in user interfaces that force a user to jump between a large number of individual visualizations, facilitating improved analysis.

In one specific example embodiment, a software application provides a visualization of a high-dimensional dataset in its user interface by executing a sequence of steps. The software application accesses the high-dimensional dataset, wherein the high-dimensional dataset is a dataset that includes a plurality of values for each of three or more variables and each variable represents a different attribute of entities. The software application calculates a marginal distribution for each of the variables, and displays in its user interface a bar chart for each of the variables showing the marginal distribution of the variable, wherein each bar chart is displayed along a different portion of a perimeter of a closed shape. The software application calculates a joint distribution for possible pairs of variables, and displays in its user interface lines connecting portions of the bar charts showing the joint distribution for each possible pair of variables, wherein each line is displayed with one or more visual properties that indicates co-occurrence frequency of values of variables.

In another specific example embodiment, a computing device is provided that includes a processor and a memory coupled to the processor that is configured to store a software application configured to visualize a dataset. The software application is operable to access the dataset, wherein the dataset includes a plurality of values for variables that represent different attributes. The software application is operable to receive in a user interface a selection of the variables to visualize. The software application is also operable to calculate a marginal distribution for each of the selected variables, and display a bar chart for each of the selected variables showing the marginal distribution of the variable. The software application is further operable to calculate a joint distribution for possible pairs of variables in the selected variables, and display lines connecting portions of the bar charts showing the joint distribution for each possible pair of variables, wherein each line is displayed with one or more visual properties that indicate co-occurrence frequency of values of variables.

In yet another specific example embodiment, a non-transitory electronic-device readable media is provided having instructions stored thereon that, when executed on one or more processors of one or more electronic devices, are operable to perform certain operations. The instructions access a high-dimensional dataset, wherein the high-dimensional dataset is a dataset that includes a plurality of values for each of three or more variables, and each variable represents a different attribute of entities. The instructions also calculate a marginal distribution for each of the variables, and display a graph for each of the variables showing the marginal distribution of the variable, wherein each graph is displayed along a different portion of a perimeter of a closed shape. The instructions further calculate a joint distribution for possible pairs of variables, and display graphics connecting the graphs, wherein the graphics connecting the graphs cross an interior of the closed shape and show the joint distribution for each possible pair of variables.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which.

DETAILED DESCRIPTION

Figure 1:
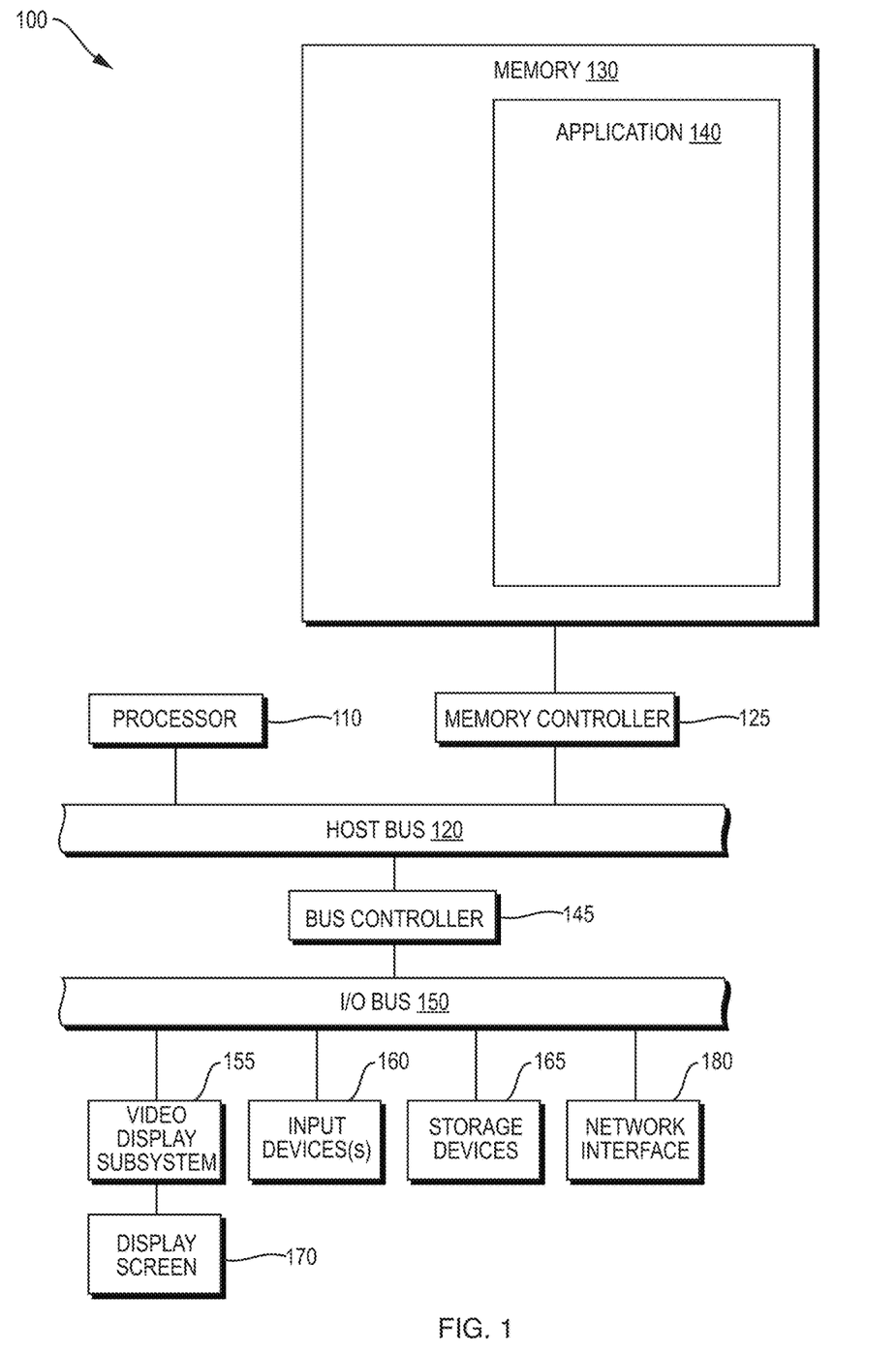
FIG. 1 is a block diagram of an example computing device that may be used to provide a visualization of high-dimensional datasets.

FIG. 1 is a block diagram of an example computing device 100 that may be used to provide a visualization of high-dimensional datasets. The computing device 100 includes at least one processor 110 coupled to a host bus 120. A memory 130 (e.g., Random Access Memory (RAM)) is also coupled to the host bus via a memory controller 125. When in operation, the memory 130 stores processor-executable instructions and data that are provided to the processor 110. An input/output (I/O) bus 150 is accessible to the host bust 120 via a bus controller 145. A variety of additional components are coupled to the I/O bus 150. For example, a video display subsystem 155 is coupled to the I/O bus 150. The video display subsystem 155 may include a display screen 170 and hardware to drive the display screen 170. At least one input device 160, such as a keyboard, a touchpad, a mouse, etc., is also coupled to the I/O bus 150. A persistent storage device 165 (e.g., a hard disk) is further attached, and may persistently store the processor-executable instructions and data, which are loaded into the volatile memory 130 when needed. Still further, a network interface 180 is coupled to the I/O bus 150. The network interface 180 enables communication over a computer network, such as the Internet, between the computing device 100 and other computing devices, using any of a number of well-known networking protocols. Such communication may enable collaborative, distributed, or remote computing with functionality spread across multiple computing devices.

Working together the components of the computing device 100 (and other computing devices in the case of collaborative, distributed, or remote computing) may execute instructions for a software application 140 (e.g., stored in the persistent storage device 165 and loaded into memory 130 upon demand) for visualizing a high-dimensional dataset. In one implementation, the high-dimensional dataset is a training dataset for a ML model that performs a ML task, and includes a plurality of values of variables that represent different properties (e.g., height, weight, material, type, voltage, phase, etc.) of elements of infrastructure (e.g., buildings, factories, roads, railways, bridges, electrical and communication networks, equipment, etc.) that have been built or are planned to be built. It should be understood, however, that in alternative implementations the high-dimensional dataset may take a wide variety of other forms. For example, the high-dimensional dataset may be licensing data for software applications, and include a plurality of values for variables that represent different aspects of licensing and usage (e.g., software features used, license types, user counts, versions, etc.).

Figure 2:
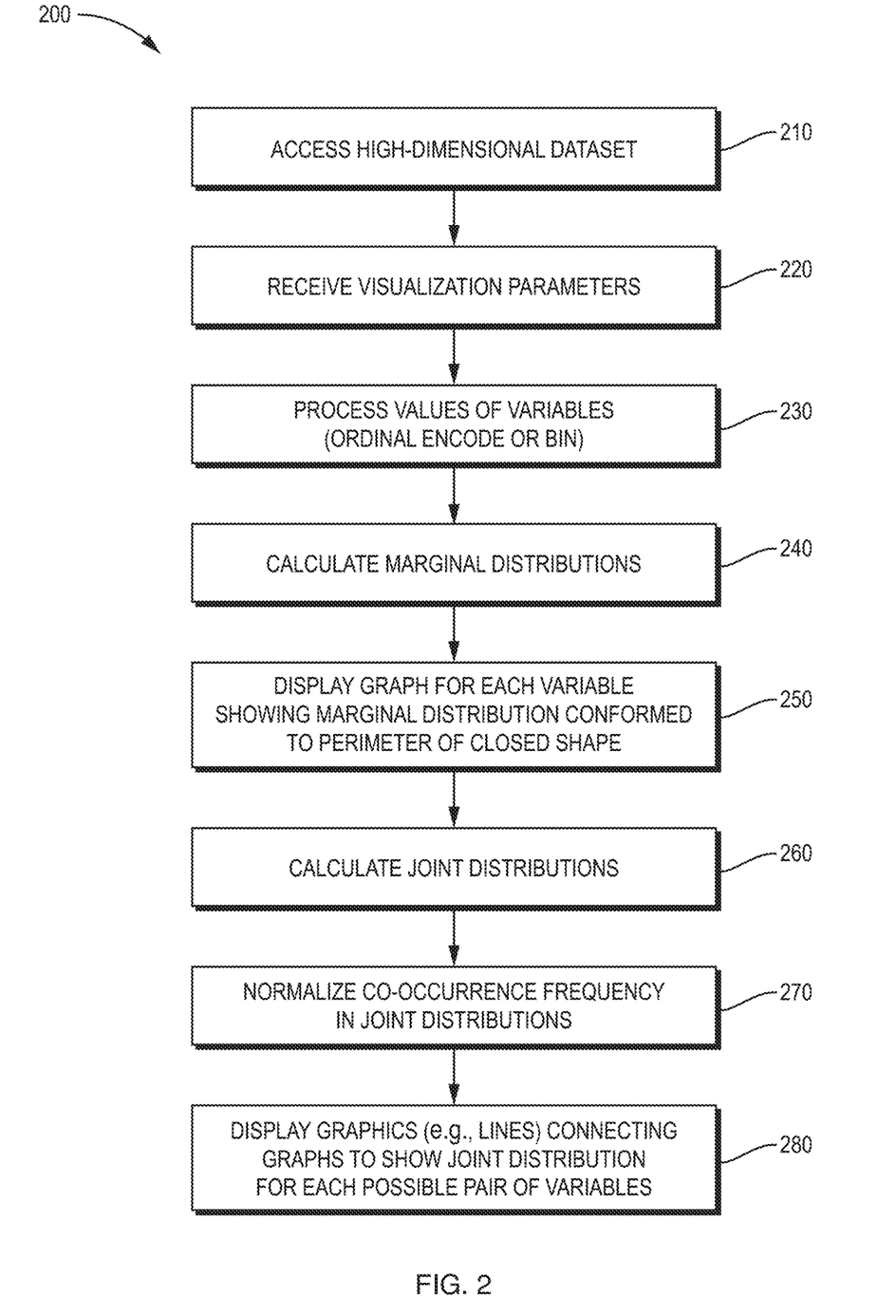
FIG. 2 is a flow diagram of an example sequence of steps that may be executed by a software application to provide a visualization of a high-dimensional dataset in its user interface.

FIG. 2 is a flow diagram of an example sequence of steps 200 that may be executed by the software application 140 to provide a visualization of a high-dimensional dataset in its user interface. At step 210, the software application 140 accesses the high-dimensional dataset (e.g., from the persistent storage device 165/memory 130). Access may be in response to selection of a file in the user interface of the software application 140. The high-dimensional dataset includes variables representing a number of attributes (N) where for each variable (i) there is a number of possible values ($M_i$). The variables may be categorical variables (i.e., variables that can take on one of a limited, and usually fixed, number of possible values) which have numeric, or more commonly non-numerical values. Alternatively, the variables may be continuous variables (i.e. variables that can take on any real value over a given interval) which most commonly have numeric values.

Figure 3:
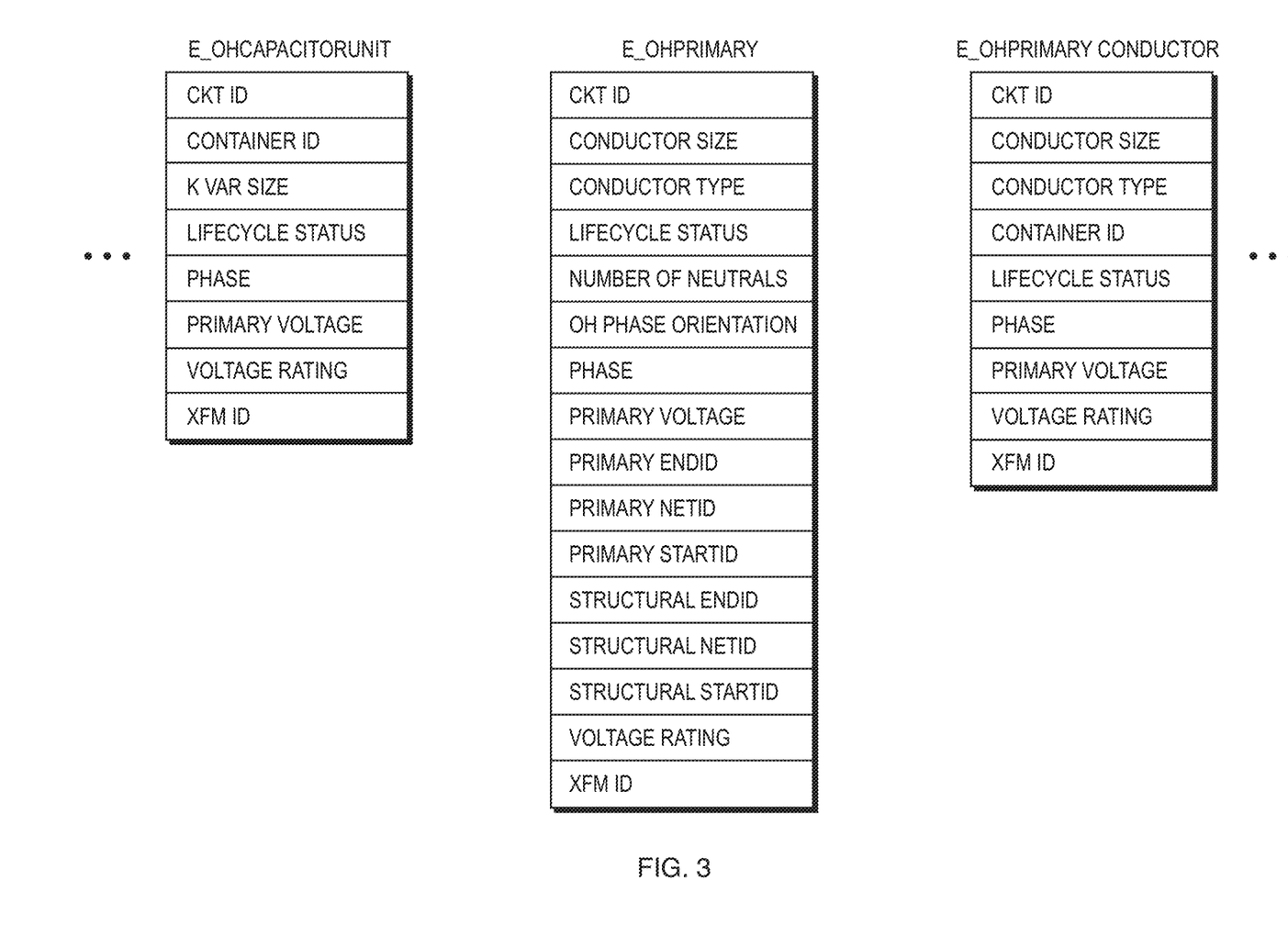
FIG. 3 is a diagram of a portion of a table-based storage arrangement for an example high-dimensional dataset.

Typically, the variables and their values are organized into tables, lists, or databases. For example, in a table-based storage arrangement each variable may correspond to a different table, and the set of possible values may correspond to the unique values encountered in the table. FIG. 3 is a diagram 300 of a portion of a table-based storage arrangement for an example high-dimensional dataset. In this example, the high-dimensional dataset is a training dataset for a ML model that performs a ML task on elements of an electrical network. The dataset has a number of tables, each of which includes a number of columns corresponding to variables represents electrical attributes. For conciseness of illustration, the columns have simply been listed, and rows corresponding to individual elements and their values for the variables have been omitted. In some examples discussed below, the "E_OHPRIMARY" table of FIG. 3 and its variables are focused on. Such table includes variables representing electrical attributes such as primary voltage, voltage rating conductor size, conductor type, number of neutrals, phase, and phase orientation, among others.

At step 220, the software application 140 receives a selection in its user interface of parameters of the visualization. The parameters may include an indication of variables to visualize. When the high-dimensional dataset includes variables representing a very large number of attributes, it may be impractical to include all variables, and the visualization may be limited to a user-selected subset thereof. Such subset may be selected in various manners. In one implementation, the selection may be made by selecting a table, and then using all variables or, optionally, selecting individual variables, included in the table. The parameters may also include filters and settings. Filters may include a minimum weight filter that represents a minimum amount of co-occurrence that needs to occur between a pair of variables before they are visualized and a minimum value diversity filter that indicates a minimum number of unique values a variable needs before the variable is included for selection. Likewise, the settings may include number of bins settings (e.g., a first number of bins setting for individual variable binning, and a second number of bins setting for co-occurrence binning). As discussed below, in the case of continuous variables, values may be organized bin and then into binning ranges. The number of bins settings may control the number of binning ranges used.

Figure 4:
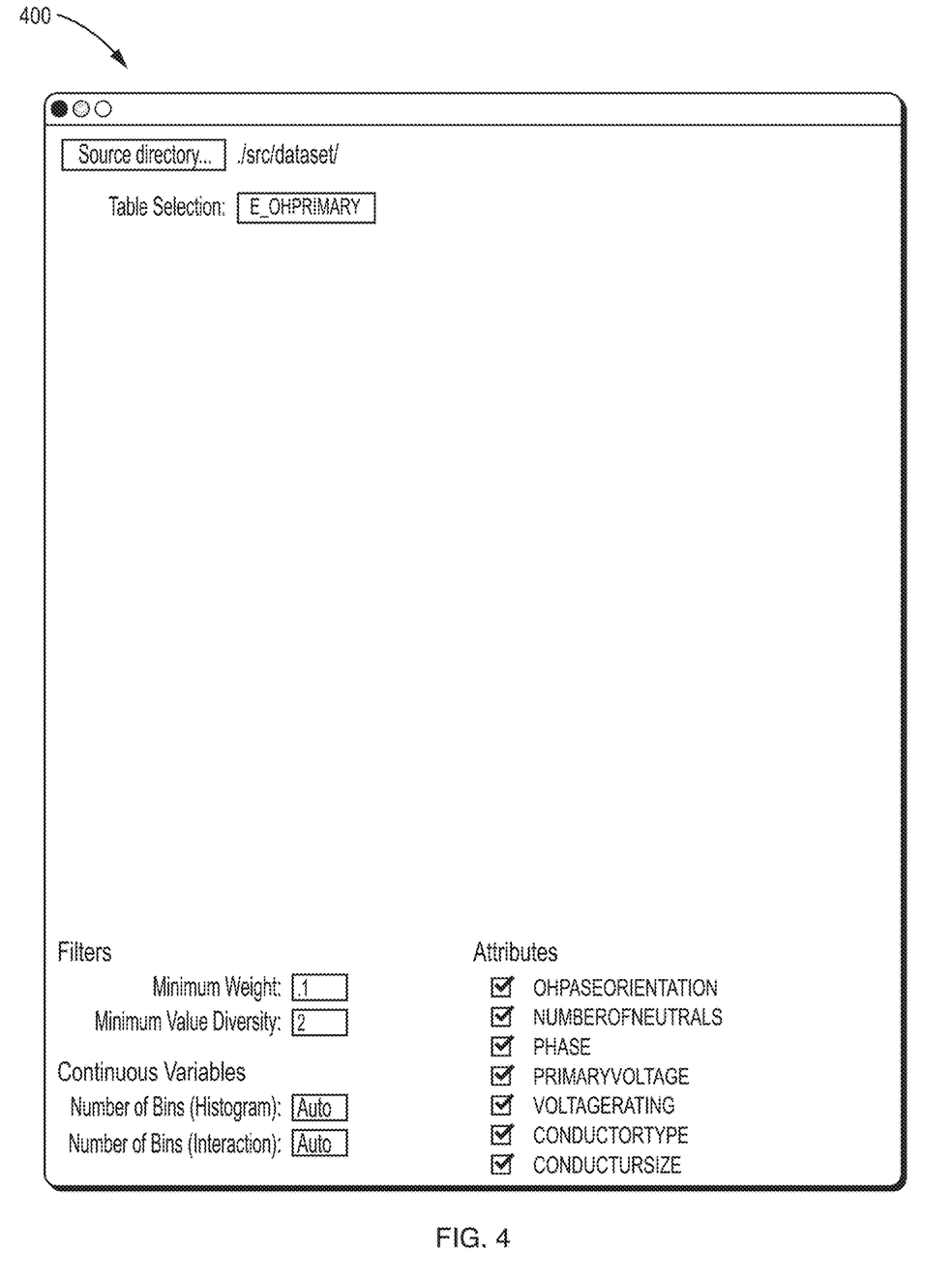
FIG. 4 is an example user interface that may be displayed on a display screen by a software application in which parameter selections may be made.

FIG. 4 is an example user interface 400 that may be displayed on a display screen 170 by the software application 140 in which parameter selections may be made. The example includes interface elements for table and variable selection, filter selection and settings selection, as discussed above.

At step 230, the software application 140 processes the values of the variables of the high-dimensional dataset to be more readily used in visualization. Where the variables are categorical variables having non-numerical values, the processing may include ordinal encoding the variables, such that $M_i$ possible values of a variable representing attribute i are encoded to $M_i$ numerical values. For example, if a variable has four possible values, these values may be encoded to integers 0 to 3. Where the variables are continuous variables, the processing may include organizing the continuous variables into bins and binning ranges (e.g., for the individual variable and/or for co-occurrence with other variables). The extent of the binning ranges may be manually configured, or automatically determined to provide a given number of ranges, for example, based on a number of bins setting.

At step 240, the software application 140 calculates a marginal distribution for each of the variables (e.g., using their ordinal encodings or binning ranges). The marginal distribution indicates the frequency that variables individually having various values.

At step 250, the software application 140 displays in its user interface on the display screen 170 a graph for each of the variables showing the marginal distribution of the variable, wherein each graph is displayed along a different part of a perimeter of a closed shape. Overall, each graph may represent all possible value occurrences of the respective variable, such that it can be interpreted as a qualitative probability mass function. In one implementation, each graph is a bar chart. Each bar chart may be a single stacked bar chart where the frequency of a value is shown by a portion of the stack, with a larger portion indicating a higher frequency and a smaller portion indicating a lower frequency. The portions may be color-coded to assist in distinguishing the values they represent. The graph may be conformed to the perimeter of a closed shape, such that it is bent, angled, or otherwise disposed to follow the perimeter. In one implementation, the closed shape is a circle, and a stacked bar chart is curved to conform to an arc along the circle.

It should be understood that in alternative implementations the graph may take any of a variety of forms other than a stacked bar chart, such as a histogram, pie chart, etc., and that the graph may or may not be conformed to the perimeter of the closed shape. Likewise, it should be understood that the closed shape may take any of a variety of forms other than a circle, such as a regular polygon, an irregular polygon, an oval, etc.

Figure 5A:
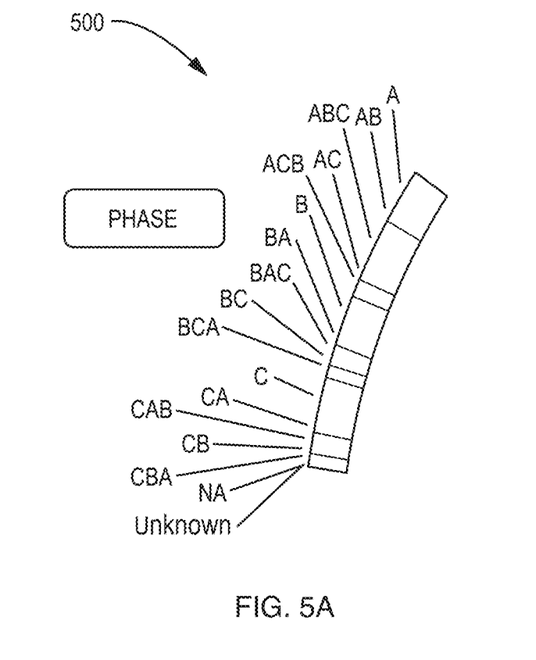
FIG. 5A is an example stacked bar chart showing the marginal distribution of a categorical variable.

FIG. 5A is an example stacked bar chart 500 showing the marginal distribution of a categorical variable. The stacked bar chart 500 is conformed to an arc along the perimeter of a circle. The stacked bar chart 500 has a title (here "PHASE") with a name of the attribute represented by the variable, and text labels (here "A", "AB", "ABC", "AC", etc.) for each portion indicating the category or value for which the portion indicates a frequency of occurrence. While in this example the labels are non-numerical, the labels also may be numeric.

Figure 5B:
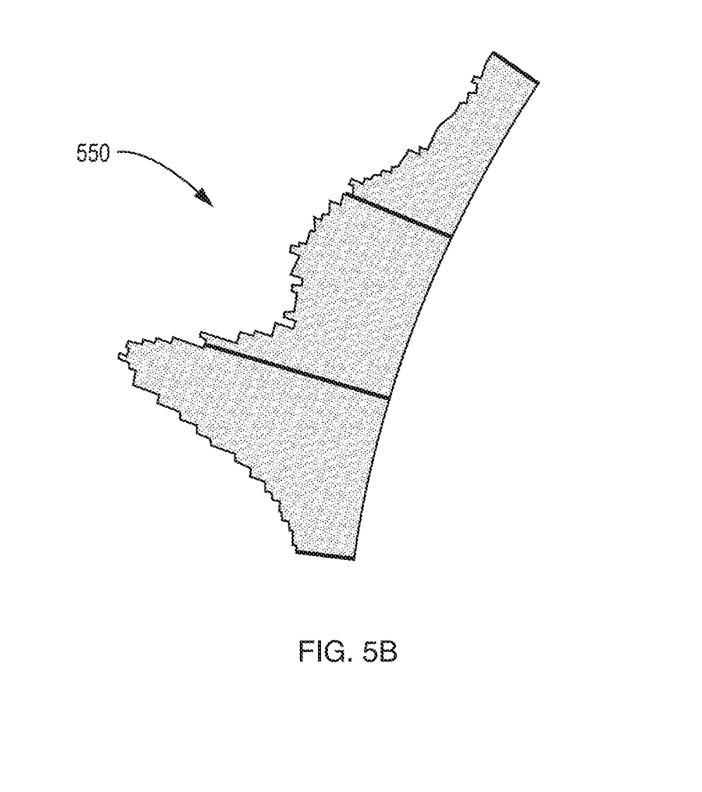
FIG. 5B is an example histogram showing the marginal distribution of a continuous variable.

FIG. 5B is an example histogram 550 showing the marginal distribution of a continuous variable. The histogram 550 has one hundred bins and is conformed to an arc along the perimeter of a circle. In response to number of bins setting, one hundred bins are divided into three binning ranges for purposes of marginal distribution. While not shown, the histogram 550 may be provided with a title and text labels similar to FIG. 5A.

The graphs (e.g., bar charts) may be arranged to be evenly distributed along the perimeter of the closed shape (e.g., circle). To assist in distinguishing between variables, the graphs (e.g., bar charts) may be separated from each other along the perimeter of the closed shape by a spacing distance, which may be automatically selected (e.g., based upon the number of variables selected to be shown).

Figure 6:
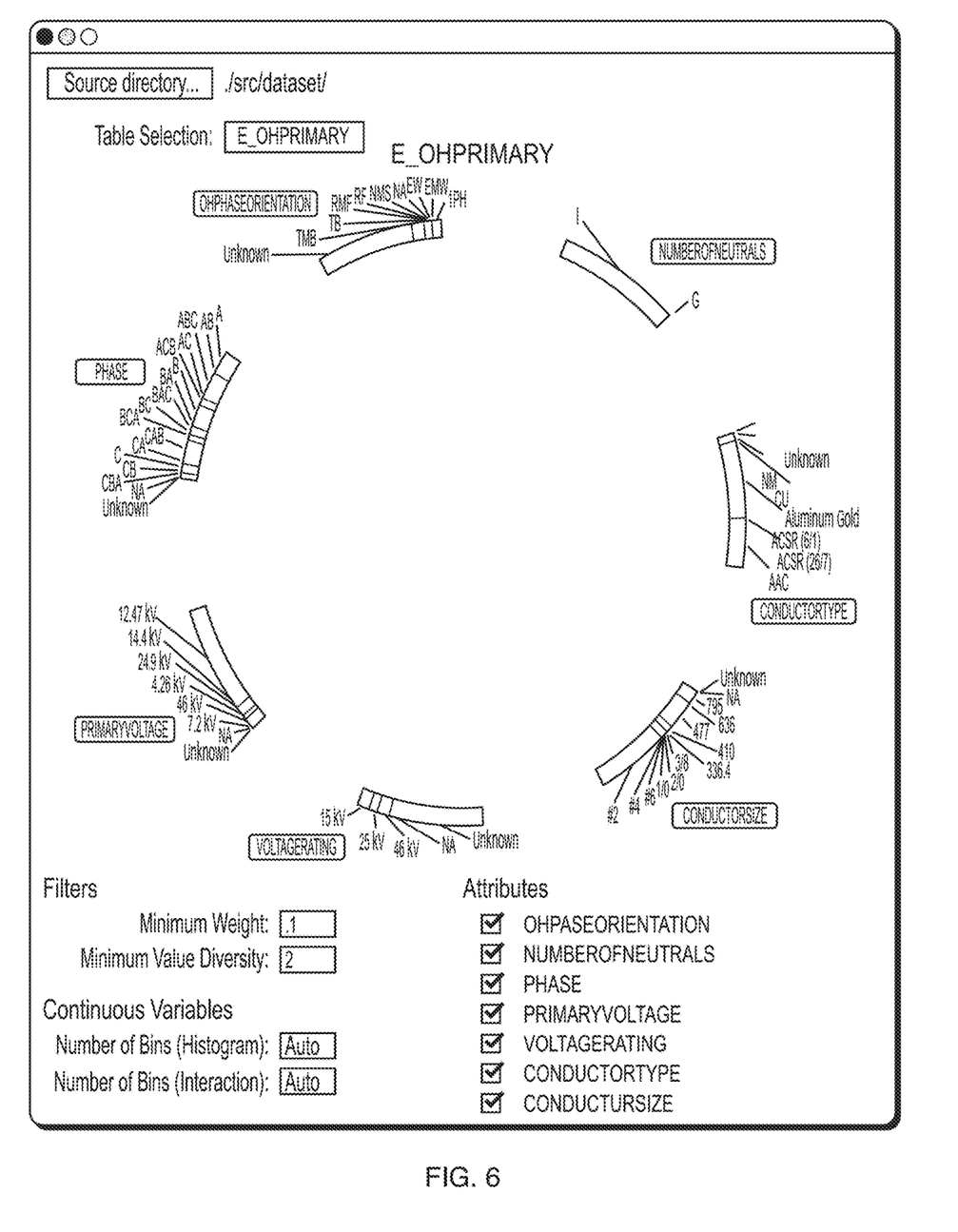
FIG. 6 is an example user interface that may be displayed on a display screen by a software application with a set of stacked bar charts showing the marginal distribution of a set of categorical variables (here 7 different categorical variables)

FIG. 6 is an example user interface 600 that may be displayed on a display screen 170 by the software application 140 with a set of stacked bar charts showing the marginal distribution of a set of categorical variables (here 7 different categorical variables). The example may represent an interim stage of producing a final visualization. In this example, the stacked bar charts are all conformed to arcs that are evenly distributed along the perimeter a circle, with a spacing distance between them. Each stacked bar chart includes a title with the name of the attribute represented by the respective variable, and text labels for each portion of the bar chart.

At step 260, the software application 140 calculates a joint distribution for possible pairs of variables, which represents the co-occurrence frequency of values of variables. For each combination of two variables and each pair of values (e.g., for a variable representing attribute i, value k and for a variable representing attribute j, value l), the software application 140 counts the number of times they appear together in the high-dimensional dataset and compares it to the total number of variable occurrences, thereby yielding a co-occurrence frequency.

At step 270, the software application 140 normalizes each co-occurrence frequency in the joint distributions. For each pair of values, for a given value of one variable of the pair (e.g., value k of a variable representing an attribute i) the normalization will typically be different than for the value of the other variable of the pair (e.g., value j of a variable representing an attribute l). This is because the variables, while sharing the same co-occurrence frequency between unique values (e.g., k and l), typically have different co-occurrence frequencies with respect to values of other variables of the high-dimensional dataset.

At step 280, the software application 140 displays in its user interface on the display screen 170 graphics connecting the graphs (e.g., bar charts) that show the joint distribution for each possible pair of variables representing attributes. The graphics may be lines that cross the interior of the closed shape (e.g., circle) connecting portions (e.g., bars) of the graphs (e.g., bar charts), for example, connecting a portion representing a value k of a variable representing an attribute i to a portion representing a value j of a variable representing an attribute l. Each line may be displayed with one or more visual properties that indicates co-occurrence frequency of values of variables corresponding to those portions. In one implementation, the one or more visual properties may include thickness, with a larger thickness indicating a larger co-occurrence frequency and a smaller thickness indicating a smaller co-occurrence frequency. For example, the thickness of a line connected to a portion representing a value k of a variable may be based on the frequency of value k co-occurring with every other value of every other variable. In this manner, the group of lines leaving a value k may represent the distribution of that value's co-occurrence with every other value of every other variable. Color coding may be used to assist in distinguishing line thickness (e.g., thicker lines may be displayed in different colors than thinner lines).

It should be understood that in alternative implementations the graphics may take forms other than lines. Likewise, it should be understood that the visual properties may include forms other than thickness and color, for example, pattern, opacity/transparency, etc. In some cases, when co-occurrence frequency is below an amount indicated by a minimum weight filter, graphics may not even be displayed to reduce visual clutter and emphasize more substantial relationships.

Figure 7A:
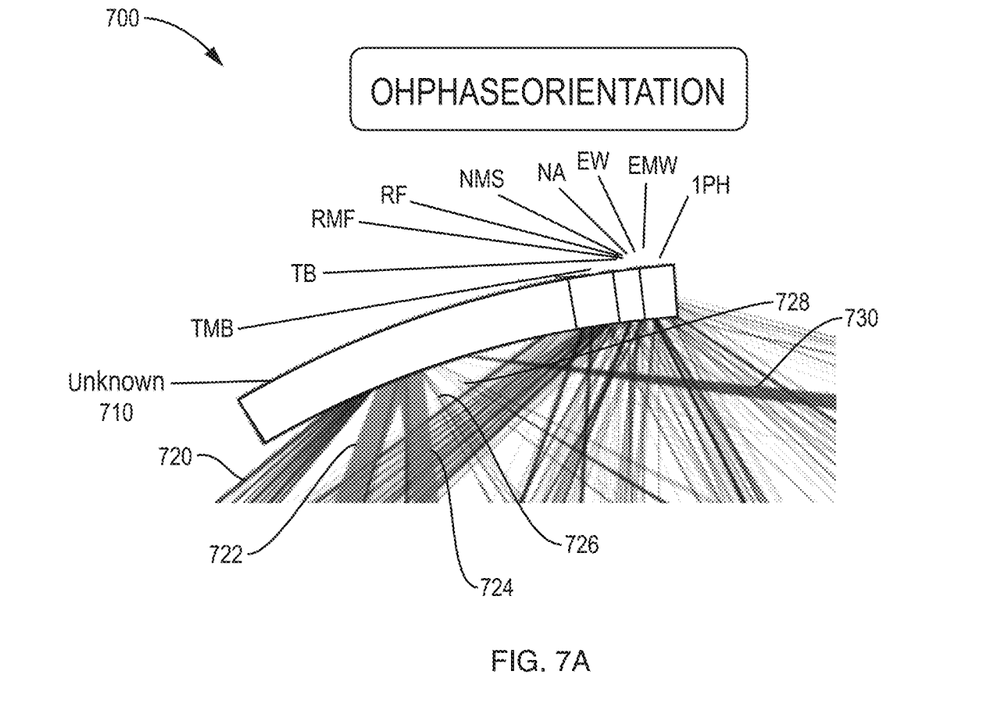
FIG. 7A is an example of a set of lines connecting to portions of a bar chart and showing joint distributions for values of a categorical variable.

FIG. 7A is an example 700 of a set of lines connecting to portions of a bar chart and showing joint distributions for values of a categorical variable. The thickness of each line connected to a portion is proportional to the frequency at which the value represented by that portion co-occurs with another value associated with the other end of the line. When there is similar frequency of co-occurrence, the line may have similar thickness. For example, six groups of lines 720-730 leave the portion 610 representing the value "unknown", of which four of them 720, 726, 728, 730 are composed of lines of fairly even thickness, indicating that the values associated with the other ends of them co-occur with "unknown" about equally often. However two other groups 722, 724 include a line that is far thicker than the others, indicating that the values associated with the other ends of them co-occur with "unknown" significantly more often.

Figure 7B:
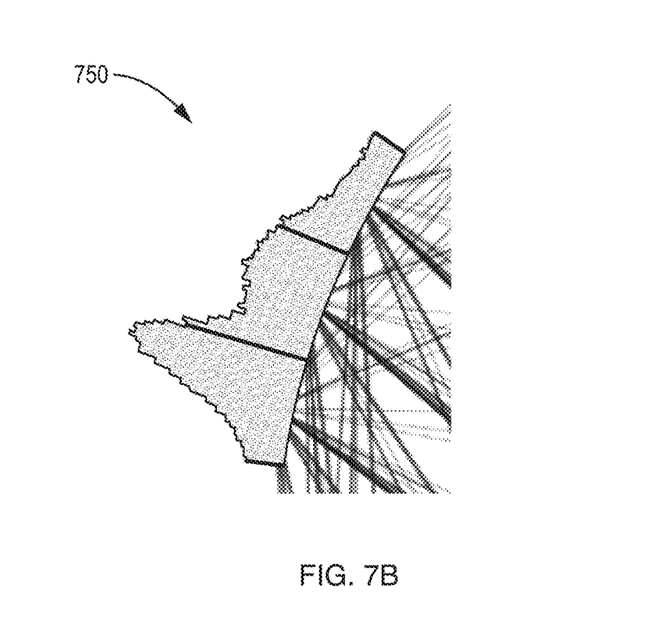
FIG. 7B is an example of a set of lines connecting to portions of a histogram showing the marginal distribution of a continuous variable.

FIG. 7B is an example 750 of a set of lines connecting to portions of a histogram showing the marginal distribution of a continuous variable. In response to a number of bins setting, the histogram 550 is divided into three binning ranges for purposes of joint distribution. The thickness of each line connected to a portion is proportional to the frequency at which a value in the bin represented by that portion co-occurs with a value in another bin associated with the other end of the line.

Figure 8:
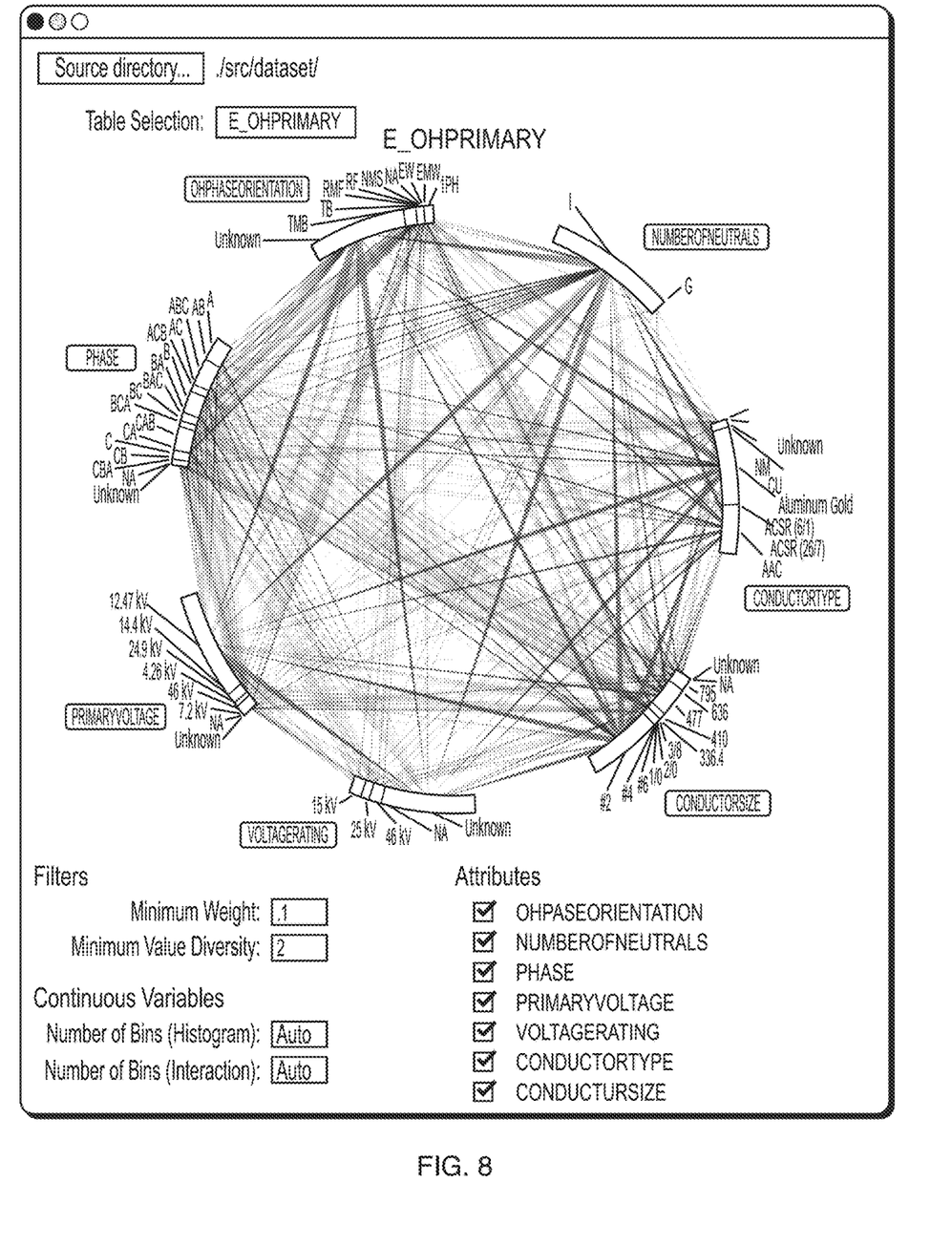
FIG. 8 is an example user interface that may be displayed on a display screen by the software application with sets of lines connecting portions of a set of bar charts showing the joint distribution of a set of categorical variables (here 7 different categorical variables).

FIG. 8 is an example user interface 800 that may be displayed on the display screen 170 by the software application 140 with sets of lines connecting portions of a set of bar charts showing the joint distribution of a set of categorical variables (here 7 different categorical variables). The example may represent a final stage of producing a visualization. The thickness of the lines connected to a portion representing a given value are proportional to the frequency at which that value co-occurs with other values of other variables. The user may use the visualization shown in FIG. 8 to perform various types of analysis. For example, in the context of training a ML model to perform a ML task, the visualization may show distributions of a training dataset and adjustments to the content of the training dataset may be made based on the visualization.

In conclusion. it should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for visualizing a high-dimensional dataset in a user interface of a software application, comprising:

accessing, by the software application executing on a computing device, the high-dimensional dataset, wherein the high-dimensional dataset is a dataset that includes a plurality of values for each of three or more variables, wherein each variable represents a different attribute of entities;

calculating, by the software application, a marginal distribution for each of the variables;

displaying, in the user interface of the software application, a bar chart for each of the variables showing the marginal distribution of the variable, wherein each bar chart is displayed along a different part of a perimeter of a closed shape;

calculating, by the software application, a joint distribution for possible pairs of variables in the variables; and     displaying, in the user interface of the software application, lines connecting portions of the bar charts showing the joint distribution for each possible pair of variables, wherein each line is displayed with one or more visual properties that indicates co-occurrence frequency of values of variables.

2. The method of claim 1, wherein the variables comprise categorical variables having non-numerical values, and the method further comprises:

ordinal encoding the categorical variables having non-numerical values into numerical values, and performing the calculating the marginal distribution and the calculating the joint distribution using the numerical values.

3. The method of claim 1, wherein the variables comprise continuous variables having numerical values, and the method further comprises:
organizing the continuous variables into binning ranges and performing the calculating the marginal distribution and the calculating the joint distribution using the binning ranges.

4. The method of claim 1, wherein the bar charts are arranged to be evenly distributed along the perimeter of the closed shape.

5. The method of claim 1, wherein each bar chart is separated from each other along the perimeter of the closed shape by a spacing distance.

6. The method of claim 1, further comprising:
normalizing, by the software application, co-occurrence frequency of values of variables after calculating the joint distribution.

7. The method of claim 1, wherein the closed shape is a circle.

8. The method of claim 1, wherein the method further comprises:
receiving, in the user interface of the software application, a selection of variables to visualize, and
wherein the displaying the bar chart and the displaying lines is performed for only the selected variables.

9. The method of claim 1, wherein the portions of the bar charts represent values of the variables, and the lines connect each portion to portions of other bar charts that represent co-occurring values of other variables.

10. The method of claim 1, wherein the one or more visual properties comprise a thickness of the line, and the thickness is proportional to co-occurrence frequency.

11. The method of claim 1, wherein the high-dimensional dataset is a training dataset for a machine learning (ML) model, the entities are elements of infrastructure that have been built or are planned to be built, and the attributes represent properties of the elements of the infrastructure.

12. A computing device, comprising:
a processor; and
a memory coupled to the processor and configured to store a software application configured to visualize a dataset, the software application when executed operable to:
access the dataset, wherein the dataset includes a plurality of values for variables that represent different attributes,
receive in a user interface a selection of variables to visualize,
calculate a marginal distribution for each of the selected variables,
display a bar chart for each of the selected variables showing the marginal distribution of the variable,
calculate a joint distribution for possible pairs of variables in the selected variables, and
display lines connecting portions of the bar charts showing the joint distribution for each possible pair of variables, wherein each line is displayed with one or more visual properties that indicate co-occurrence frequency of values of variables.

13. The computing device of claim 12, wherein each bar chart is displayed along a different part of a perimeter of a closed shape.

14. The computing device of claim 12, wherein the variables comprise categorical variables having non-numerical values, and the software application when executed is further operable to:
ordinal encode the categorical variables having non-numerical values into numerical values.

15. The computing device of claim 12, wherein the variables comprise continuous variables having numerical values, and the software application when executed is further operable to:
organize the continuous variables into binning ranges.

16. A non-transitory electronic-device readable media having instructions stored thereon that, when executed on one or more processors of one or more electronic devices, are operable to:
access a high-dimensional dataset, wherein the high-dimensional dataset is a dataset that includes a plurality of values for each of three or more variables, wherein each variable represents a different attribute of entities;
calculate a marginal distribution for each of the variables;
display a graph for each of the variables showing the marginal distribution of the variable, wherein each graph is displayed along a different part of a perimeter of a closed shape;
calculate a joint distribution for possible pairs of variables in the variables; and
display graphics connecting the graphs, wherein the graphics connecting the graphs cross an interior of the closed shape and show the joint distribution for each possible pair of variables.

17. The non-transitory electronic-device readable media of claim 16, wherein the graphs are bar charts and the graphics connecting the graphs comprise lines connecting portions of the bar charts, wherein each line is displayed with one or more visual properties that indicate co-occurrence frequency of values of variables.

18. The non-transitory electronic-device readable media of claim 17, wherein the portions of the bar charts represent values of the variables, and the lines connect each value of a given variable to values of other variables.

19. The non-transitory electronic-device readable media of claim 17, wherein the closed shape is a circle and the bar charts are arranged to be evenly distributed along the perimeter of the circle.

20. The non-transitory electronic-device readable media of claim 17, wherein the one or more visual properties comprise a thickness of the line, and the thickness is proportional to co-occurrence frequency.

* * * * *